United States Patent [15] 3,689,743

Rampy et al. [45] Sept. 5, 1972

[54] MAGNETIC CHARACTER READER

[72] Inventors: C. W. Rampy, Grapevine; Alba J. Bonham, Plano, both of Tex.

[73] Assignee: Hycel, Inc., Houston, Tex.

[22] Filed: May 5, 1970

[21] Appl. No.: 34,821

[52] U.S. Cl...........235/61.11 D, 179/100.2 A, 179/100.2 K, 235/61.12 M

[51] Int. Cl.........G06k 7/08, G06k 19/00, G11b 5/00

[58] Field of Search.........235/61.114, 61.115, 61.12, 235/61.12 M, 61.12 ND; 340/146.3 C, 146.3 Z, 174.1 G, 174.1 H; 179/100.2 CB, 100.2 A, 100.2 K

[56] References Cited

UNITED STATES PATENTS

| | | | |
|---|---|---|---|
| 3,100,834 | 8/1963 | Demer | 179/100.2 D |
| 3,353,164 | 11/1967 | Folsam | 340/174.1 H |
| 2,833,475 | 5/1958 | Dedek | 235/61.11 D |

*Primary Examiner*—Maynard R. Wilbur
*Assistant Examiner*—Thomas J. Sloyan
*Attorney*—James F. Weiler, William A. Stout, Paul L. DeVerter, II, Dudley R. Dobis, Jr. and Henry W. Hope

[57] ABSTRACT

Disclosed is magnetic character reader which records an ac signal on discontinuous portions of magnetic material and detects the prerecorded signal as a function of character width to decode the character significance of the magnetic portions.

5 Claims, 4 Drawing Figures

INVENTORS
C W RAMPY
ALBA J. BONHAM
Jack A Kanz
ATTORNEY

MAGNETIC CHARACTER READER

This invention relates to character recognition systems. More particularly it relates to methods and apparatus for reading information represented by discontinuous magnetic materials disposed upon non-magnetic carriers.

Various types of magnetic character recognition systems have been developed. Characteristically these systems employ a non-magnetic carrier strip such as tape or the like upon which are disposed characters or code bars (or combinations thereof) comprised of magnetic materials. The information represented by the characters or code bars is deciphered by moving the magnetic materials past a dc biased magnetic device and measuring changes in magnetic flux as the magnetic character passes through the field. Depending on the type of system used, the information represented is deciphered by determining the number, size, shape or absence of magnetic materials at specific locations on the carrier. It is well known, however, that magnetic characters formed by printing or typing with magnetic ink or ribbon do not possess uniform magnetic qualities. Accordingly, in systems such as those described above, the magnetic characters are moved past the magnetic device at great speeds in order to enhance the rate of change in magnetic flux and thereby produce a detectable signal. Unfortunately, since the recorded information must be moved by the detecting means at great speeds in order to produce a detectable signal, the scanning rate of the detecting means (in terms of number of characters scanned per unit of time) is likewise extremely high unless unreasonably large characters are used. Consequently, decoding, translation and printing equipment associated with such scanning equipment must also be capable of operating at extremely high rates or must include means for time expansion of the signals detected.

There is a great need for inexpensive magnetic character recognition equipment capable of reading magnetic characters at a scan rate consistent with conventional print-out means such as the teletypewriter. The conventional teletypewriter, however, is limited to a printing speed of ten characters per second. Accordingly, using characters 0.045 inch wide, the medium carrying such information must move past the detector at a rate of no more than 0.9 inch per second. At this speed, however, conventional magnetic character reading devices are wholly inoperative since the rate of change in flux caused by moving a magnetic character past a conventional magnetic tape detecting head at this speed cannot be reliably detected unless high quality magnetic characters are used.

In accordance with the principles of this invention a magnetic character reading system is provided which is capable of reading and decoding information carried by magnetic characters formed by typing, printing, or the like on a non-magnetic medium at rates slow enough to be compatible with conventional teletypewriter equipment without the use of storage devices or the like. Briefly, information is imprinted on a non-magnetic carrier in a coded structure or character disposed in two parallel tracks. The non-magnetic carrier is first moved past means for recording a continuous ac signal in any magnetic material passing within the field thereof. The magnetic material is then moved past a conventional magnetic play-back head which detects the ac signal previously recorded in the magnetic carrier. Since the presence or absence of a magnetic character in any character position on the medium is determined by the presence or absence of a prerecorded ac signal (rather than the change in flux resulting from the movement of a magnetic material through the dc field of the play-back head) a readily detectable signal is provided. Furthermore, by recording an ac signal of constant frequency on the magnetic materials, the width of the magnetic character or code bar in each character position may be readily determined and utilized to determine the code significance of the character detected. By measuring the duration of the ac signal recorded on each portion of magnetic material, rather than determining simply the presence or absence of a magnetic material, extremely high accuracy may be obtained. Other features and advantages of the invention will become more readily understood from the following detailed description taken in connection with the appended claims and attached drawings in which:

The transport medium used for carrying the coded information utilized in accordance with the invention may take any conventional form. For example, the coded information may be simply printed on a non-magnetic tape, ribbon or the like, or may be typed or printed on cards, tags, checks, or any other suitable media. The only required characteristic of the transport medium is the ability to be moved past the recording and detection stations at a relatively constant velocity.

Figure 1:
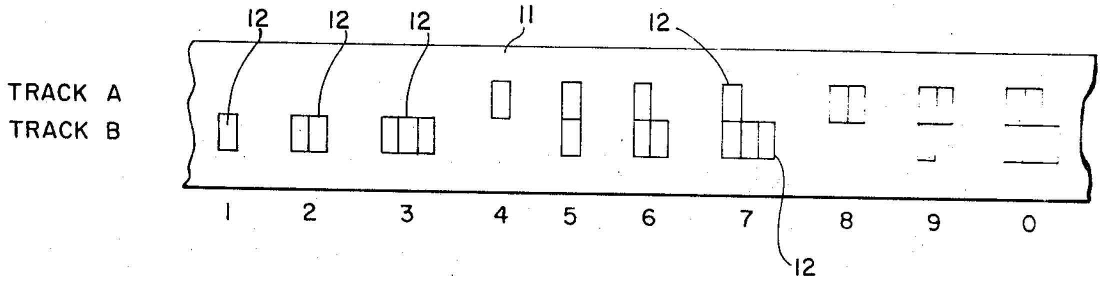
FIG. 1 is a diagramatic representation of a non-magnetic medium carrying magnetic code characters for use in connection with the invention.

As illustrated in FIG. 1, the transport medium may take the form of a paper tape 11 upon which are imprinted suitable magnetic characters, code bars or the like. In accordance with the preferred embodiment of the invention, information is imprinted on the non-magnetic transport medium in the form of magnetic bars 12 positioned in parallel tracks (identified as TRACK A and TRACK B).

The illustration of FIG. 1 discloses a suitable code form for numerical information displayed serially. In the code form illustrated each character position on the tape contains a maximum of three code increments in each track of each character position. In order to use a simplified logic network for decoding information, each code increment in TRACK B is assigned a value of one bit. Each code increment in TRACK A is assigned the value of 4 bits. Accordingly, a simplified code for identifying the digits 0 to 9 is illustrated. The digit 1 is represented by a magnetic bar occupying one code increment in TRACK B. The digit 2 is represented by a magnetic bar occupying two code increments and the digit 3 is represented a magnetic bar occupying three code increments in TRACK B. The digit 4 would be represented by one magnetic bar occupying one code increment in TRACK A, while the digit 5 would be represented by magnetic bars occupying one code increment in each of TRACKS A and B. It will readily be observed that by accumulating the bit value in each character position digits 1 through 9 may be readily code represented on the parallel tracks as illustrated in FIG. 1. The digit 0, however, is arbitrarily assigned the value of eleven bits and therefore is represented by a magnetic bar occupying two code increments in TRACK A and a magnetic bar occupying three code increments in TRACK B at the same character position.

Since the maximum output speed of conventional teletypewriter equipment is 10 characters per second, the medium must be transported past the detecting mechanism at this rate or slower. Accordingly, by using code increments 0.015 inch wide and moving the medium past the detection station at 0.9 inch per second, characters or code bars of acceptable dimensions may be used and read at rates compatible with teletype printers without time expansion or contraction of the signal during any phase of the translation process.

It will readily be observed that the simplified code structures illustrated in FIG. 1 may be formed by any conventional means such as printing, typing or otherwise, using a conventional magnetic ink or ribbon.

Figure 2:
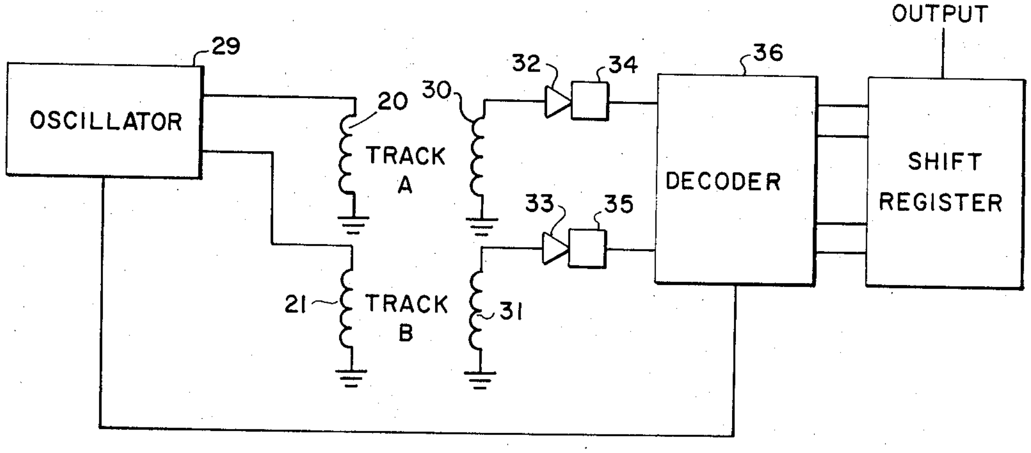
FIG. 2 is a schematic illustration of the preferred embodiment of the invention.

Information encoded on strip 11 is read and decoded by apparatus such as illustrated schematically in FIG. 2. The carrier strip 11 is moved past a pair of conventional record heads 20 and 21 positioned so that TRACK A passes directly adjacent record head 20 and TRACK B passes adjacent record head 21. Record heads 20 and 21 may be connected to a suitable signal generator 29 providing a constant frequency ac signal as will be described hereinafter. The carrier 11 is then drawn past a pair of conventional read-out heads 30 and 31 positioned to detect signals encoded in TRACK A and TRACK B, respectively. It will readily be observed that since the code bars 12 are the only magnetic materials contained in TRACK A and TRACK B on carrier 11, the ac signal from the record heads will only be recorded in those portions of the character position wherein a code bar is located. Since the code bars 12 are of predetermined widths and move past the record heads 20 and 21 at a constant velocity, the number of pulses recorded in each code bar is determined by the width of the bar and the frequency of the ac signal.

In the preferred embodiment a recording frequency of 220 cps is utilized. When the code bars are moved past the record head at a rate of 0.9 inch per second a maximum of four pulses may be recorded in each code increment width of 0.015 inch. Since a maximum of three code increment widths may occupy any character position in each track, a maximum of twelve pulses may be recorded in each track in any one character position. Accordingly, the width of any magnetic code bar, and hence the code value of the bar, may be determined by counting the pulses recorded in each character position in each track.

From the foregoing it will be readily observed that extremely simple counting, dividing, and decoding equipment may be utilized to interpret and translate the coded information read by the detection heads. The ac signals derived from the code bars by the play-back heads 30 and 31 are first fed into amplifiers 32 and 33 and the amplified signals fed into pulse counters-dividers 34 and 35 and decoder 36.

Figure 3:
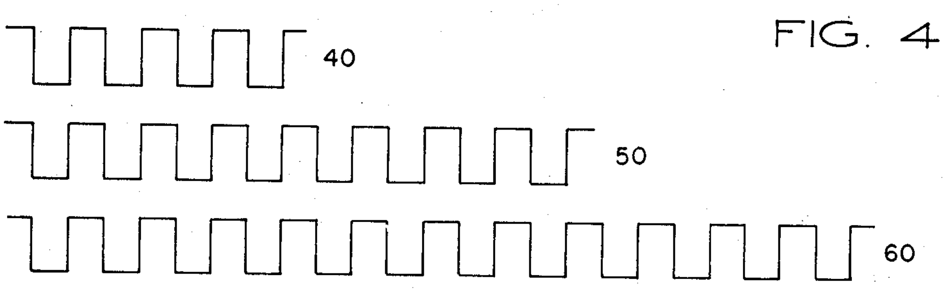
FIG. 3 is a diagramatic representation of the signal detected by the reading apparatus of the invention.

Referring now to FIG. 3, it will be observed that the signal received by a counter-divider 34 or 35 when a magnetic bar occupying a single code increment is passed by a reproduced head contains a maximum of four pulses as indicated at 40. Likewise since a magnetic bar occupying two code increments is twice as wide, the maximum number of pulses received from a magnetic bar occupying two code increments in a single character position will be eight pulses as shown at 50 and the maximum number of pulses recorded in a three code increment bar is twelve pulses as indicated at 60.

Figure 4:
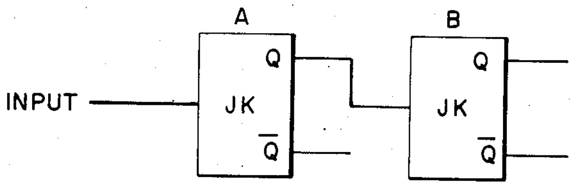
FIG. 4 is a schematic illustration of the preferred decoding network of the invention.

Interpreting the signal received can be performed with high reliability through the use of a simple two-element counter which interprets four pulses as a 1, eight pulses as a 2 and twelve pulses as a 3. Even more reliable interpretation can be accomplished, however, through the use of a J-K counter-divider network, as illustrated in FIG. 4, which essentially divides the input pulses by four and produces an output in accordance with the truth table shown in Table I. The accuracy and reliability of this counter-divider even in the event of a loss of counted pulses is illustrated in the two-element counter-divider truth Table I illustrating the condition of the network of FIG. 4 as each pulse is detected.

TABLE I

| Input Pulses | A Q | $\bar{Q}\bar{Q}$ | B Q | Output $\bar{QA + QB}$ | Readout |
|---|---|---|---|---|---|
| 0 | − | +− | + | − | 0 |
| 1 | + | — | + | + | 1 |
| 2 | − | ++ | − | − | |
| 3 | + | −+ | − | − | |
| 4 | − | +− | + | − | |
| 5 | + | — | + | + | 2 |
| 6 | − | ++ | − | − | |
| 7 | + | −+ | − | − | |
| 8 | − | +− | + | − | |
| 9 | + | − | + | + | 3 |
| 10 | − | ++ | − | − | |
| 11 | + | −+ | − | − | |
| 12 | − | +− | + | − | |

From the above table it will be observed that the counter-divider will interpret decode one, two, three or four pulses as a 1, five, six, seven or eight pulses as a 2, and nine, 10, 11 or 12 pulses as a 3. Accordingly, failure to read one pulse out of four recorded in a magnetic bar occupying a single code increment, through improper timing or alignment, poor quality recording material, etc., will have no effect on the accuracy of the counter-divider output. Furthermore, to accurately determine the bit value of a magnetic bar occupying three code increments, the counter-divider need only register nine pulses of the 12 pulses available.

Identical counter-divider networks, of course, may be used for signals from TRACK A and TRACK B, and the output from the counter-divider networks fed to a conventional decoder 36 and shift register to drive the output or printing apparatus. As illustrated in FIG. 2, the same signal generator 29 may be used to provide a clock signal for the decoder 36. The counter-dividers 34 and 35 may be conventionally reset after reading each code bar, such as by the clock signal from signal generator 29. The decoder 36 may be of a conventional type such as Fairchild Model No. 9311, shown in MSI Pocket Guide of Fairchild Semiconductor, dated January 1970.

It will be readily observed that the apparatus described herein may be fabricated from conventional components which are readily available. Choice of components is determined chiefly by the desired use of the system. It should also be observed that while the invention has been described with particular reference to code increment widths of 0.015 inch, this dimension is selected merely as a convenient code increment width for use in the described apparatus.

It will be readily observed that although the invention has been described with reference to scanning rates compatible with teletypewriter printing speeds, the invention is not so limited. In fact, the scanning rate is only limited by the mechanical transport capacity of the recording and reading stations and the storage or output capacity of the equipment utilizing the output. For example, the scanning rate of the apparatus described may be adjusted to conform to any other equipment while maintaining its high accuracy by appropriately adjusting the frequency of the ac recording signal and the media transport mechanism.

Since apparatus for performing the process described above may be fabricated quite inexpensively from conventional components, various systems may be devised for utilizing the teachings of this invention to provide automatic inventory control or the like. For example, merchandise may be tagged with labels, cards or the like, each bearing a numerical code representing the price, quantity, etc. of such articles in stock. As the articles are removed from stock the labels are removed and the information encoded thereon tabulated with apparatus such as that described herein to provide a current accurate list of all articles removed from inventory at any given time period and for tabulating other information which may be encoded on the tags. Likewise similar apparatus may be constructed to provide complete accounting, tabulation, or other control procedures.

It is not necessary that the recording signal be placed on the tape immediately prior to reading the code as described. The signal may be recorded at any time prior to passing the tape through the reproduce station. It should also be recognized that the signals derived from the read-out heads may be amplified and transferred to magnetic tape or other suitable storage or recording means. The data may then be electronically analyzed by suitable decoding means at a remote location.

Utilizing the principles of this invention, an ac signal is recorded in discontinuous portions of magnetic material disposed at preselected locations on a non-magnetic carrier. Any simple conventional non-return to-zero recording may be used to impress an ac signal on the magnetic material passing the record head. Preferably, the ac signal is recorded on the entire magnetic bar extending across the recording track.

Conventional playback heads having a track width of 21 mils positioned approximately the center of each track may be used to detect ac signals recorded in the magnetic material. Accordingly, by recording the signal on the entire track height, read-out error caused by misalignment of recording and playback stations can be minimized. Furthermore, precisely formed code bars are unnecessary since the playback station does not necessarily scan the entire height of the character position but only operates on that portion of the magnetic code bar passing the playback head. The width of the code bar is critical only within the limits described hereinabove with reference to the decoder network. Accordingly, magnetic characters formed by conventional printing with magnetic ink or typing with magnetic ink ribbon will ordinarily be of sufficient quality to be used with the system.

Although the invention has been described with reference to moving the carrier past the record and playback stations, it should be observed that only relative movement is required. Accordingly, the carrier may be held stationary and either the record station and/or the playback station moved relative to the carrier and the magnetic materials thereon.

While the invention has been described with particular reference to specific embodiments thereof, it is to be understood that the forms of the invention shown and described in detail are to be taken as preferred embodiments of same, and that various changes and modifications may be resorted to without departing from the spirit and scope of the invention as defined by the appended claims.

What is claimed is:

1. The method of coding and decoding information represented by magnetic characters disposed on a non-magnetic carrier comprising the steps of:
   a. placing magnetic bars of pre-selected widths on a non-magnetic medium to form variable width characters,
   b. moving said medium relative to a recording station at a relatively constant velocity,
   c. recording an ac signal on said magnetic bars as they pass said recording station,
   d. moving said medium relative to a detecting station at a relatively constant velocity,
   e. detecting the ac signal recorded on said magnetic bars, and
   f. counting and dividing the ac signal pulses recorded on each of said bars to determine the character widths and significance thereof.

2. The method set forth in claim 1 wherein said magnetic bars are disposed in adjacent parallel tracks.

3. Magnetic character recognition apparatus comprising:
   a. means for transporting a non-magnetic carrier having magnetic characters having different preselected widths disposed thereon sequentially past a record station and a play-back station,
   b. means for recording an ac signal of constant frequency on said magnetic characters as said magnetic characters pass said record station,
   c. means for detecting said ac signal recorded on said magnetic characters, and
   d. means for counting and dividing the number of pulses recorded in each of said magnetic characters thereby measuring the width of said characters.

4. The method of coding and decoding information represented by different magnetic characters of different preselected widths disposed on a non-magnetic carrier comprising the steps of:
   moving the carrier and the magnetic characters relative to a recording station at relatively constant velocity, recording a continuous ac signal of constant frequency on the magnetic characters as they pass the recording station whereby the number of ac pulses recorded is dependent on the width of the characters, moving said carrier and said magnetic characters relative to a decoding station at said constant velocity, detecting the ac signal recorded on said magnetic characters, counting and dividing the ac signal pulses recorded on each of said characters to determine the widths thereof, and decoding the counted signal pulses to identify the characters.

5. Magnetic encoding and decoding apparatus comprising, an ac signal source of constant frequency, a non-magnetic transport medium having a plurality of different magnetic characters of different preselected widths disposed thereon in parallel tracks, a pair of record heads adapted to record said ac signal on said magnetic characters whereby the number of ac pulses recorded on each different character is dependent on the width of each magnetic character, a pair of magnetic playback heads positioned to follow said parallel tracks as the transport medium and magnetic characters are moved past said playback heads, means for counting the number of ac pulses recorded on each magnetic character thereby determining the width of the particular magnetic character disposed on the medium, and decoding means for converting the counted signal pulses into identifying signals of the magnetic characters.

* * * * *